June 1, 1943.　　　W. CROPPER　　　2,320,349
REFRIGERATION
Filed Sept. 25, 1941
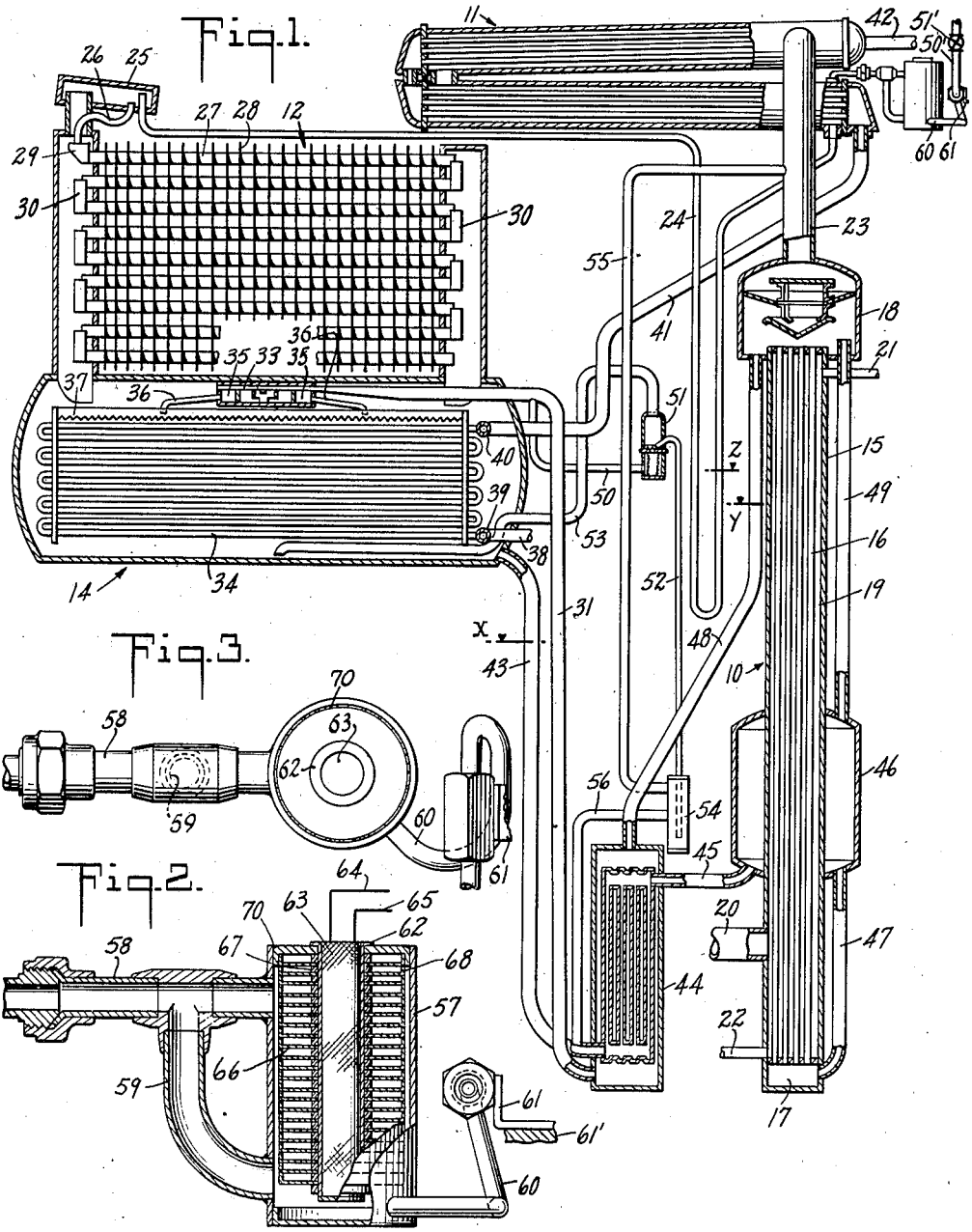
INVENTOR.
Walter Cropper
BY
EQ Fenander
his ATTORNEY Patented June 1, 1943

2,320,349

UNITED STATES PATENT OFFICE 2,320,349

REFRIGERATION

Walter Cropper, Evansville, Ind., assignor to Servel, Inc., New York, N. Y., a corporation of Delaware Application September 25, 1941, Serial No. 412,249

9 Claims. (Cl. 62—1)

This invention relates to refrigeration, and more particularly to the removal of non-condensible gases from refrigeration systems.

It has already been proposed to remove non-condensible gases from refrigeration systems by causing such a gas to come in contact with a substance having an affinity for the gas. The non-condensible gas preferably is removed by causing the gas to react chemically with a suitable substance within the system.

It is an object of this invention to provide an improved cartridge unit which can be connected to the gas space of a refrigeration system, such unit containing a substance capable of reacting chemically with a non-condensible gas which may accumulate in the system. More particularly, it is an object to provide such a cartridge unit in which the substance to which free access of gas is permitted is in sheet-like form and a number of such sheets are rigidly stacked in spaced relation, so that the resulting chemical reaction is readily effected without appreciably blocking flow of gas past the sheets which are perforated.

The invention, together with the above and other objects and advantages thereof, will be better understood from the following description taken in connection with the accompanying drawing forming a part of this specification and of which:

Fig. 1 more or less diagrammatically illustrates a refrigeration system in which the invention is embodied;

Fig. 2 is an enlarged vertical sectional view of the cartridge unit show in Fig. 1; and Fig. 3 is a horizontal plan view of the cartridge unit shown in Figs. 1 and 3.

Referring to Fig. 1, the present invention is embodied in a two-pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator 10, a condenser 11, an evaporator 12 and an absorber 14 which are interconnected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system. In Fig. 1 the generator 10 includes an outer shell 15 within which are disposed a plurality of riser tubes 16 having the lower ends thereof communicating with a space 17, and the upper ends thereof extending into and above the bottom of a vessel 18.

The space within shell 15 and surrounding the tubes 16 forms a chamber 19 to which steam is supplied through a conduit 20. The chamber 19 provides for full length heating of the tubes 16 with the top part of the chamber being vented at 21 to atmosphere. A conduit 22 is connected to the bottom part of shell 15 for draining condensate from chamber 19.

The system operates at a partial vacuum and may contain a water solution of refrigerant in absorption liquid, such as, for example, a water solution of lithium chloride or lithium bromide or a suitable mixture of the salts. With steam being supplied to chamber 19 through conduit 20 at atmospheric pressure, heat is applied to tubes 16 whereby water vapor is expelled from solution, such expelled vapor serving as the refrigerant and being effective to raise liquid absorbent by gas or vapor-lift action. The expelled vapor passes from the upper ends of tubes 16 into the vessel 18, and thence flows through a conduit 23 into condenser 11 in which the expelled vapor is liquefied. The condensate formed in condenser 11 flows through a U-tube 24, vessel 25 and conduit 26 to the top part of evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost bank of tubes 27. The dividing of liquid may be effected by providing a liquid distributing trough 29 into which the liquid flows from the conduit 26. The liquid passes through successively lower banks of tubes through suitable end connections 30 which are open to permit escape of vapor from the tubes, and any excess liquid is discharged from the bottom bank of tubes 27.

The refrigerant evaporates in evaporator 12 to produce a refrigerating or cooling effect with consequent absorption of heat from the surroundings, as from a stream of air flowing over the exterior surfaces of the evaporator. The refrigerant vapor formed in evaporator 12 flows therefrom to the absorber 14 into which absorption liquid is introduced at the top part through a conduit 31. The absorption liquid is discharged from the upper end of conduit 31 into a vessel 33 in which liquid is distributed laterally or crosswise of a plurality of vertically disposed pipe banks 34 which are arranged alongside of each other. The liquid flows from the center part of vessel 33 into laterally disposed end chambers 35 and thence through conduits 36 to a plurality of liquid holders and distributors 37 which extend lengthwise of and above the uppermost horizontal tubes of the pipe banks 34. Absorption liquid is siphoned over the walls of the liquid holders 37 to effect wetting of the uppermost horizontal tubes. Liquid drips from each horizontal tube onto each next lower tube, so that all of the tubes are wetted by a film of liquid.

The absorber 14 and condenser 11 constitute heat rejecting parts of the refrigeration system and are cooled by a suitable cooling fluid, such as water, for example, which enters the bottom parts of the pipe banks 34 through a conduit 38 and manifold 39, and leaves the top part of the pipe banks through a manifold 40 and conduit 41. The conduit 41 is connected to condenser 11 so that the same cooling fluid can be utilized to cool the absorber 14 and condenser 11, the cooling fluid then leaving the condenser through a conduit 42.

The refrigerant vapor is absorbed into absorption liquid in absorber 14 and the solution flows from the latter through a conduit 43, a first passage in liquid heat exchanger 44, conduit 45, vessel 46 and conduit 47 into the bottom space 17 of generator 10. Refrigerant vapor is expelled out of solution in generator 10 by heating, and liquid is raised by gas or vapor-lift action in riser tubes 16, as explained above.

Absorption liquid from which refrigerant vapor has been expelled flows from vessel 18 through a conduit 48, a second passage in liquid heat exchanger 44, and conduit 31 to the top part of absorber 14. The upper part of vessel 46 and vessel 18 are connected by a conduit 49, so that the pressure in vessel 46 is equalized with the pressure in the top part of generator 10 and condenser 11.

The system operates at low pressures with the generator 10 and condenser 11 operating at one pressure and the evaporator 12 and absorber 14 operating at a lower pressure, the pressure differential between these parts being maintained by liquid columns. Thus, the liquid column formed in U-tube 24 maintains the pressure differential between condenser 11 and evaporator 12, the liquid column in conduit 43 maintains the pressure differential between the outlet of absorber 14 and generator 10, and the liquid column formed in conduits 31 and 48 maintains the pressure differential between the inlet of the absorber and the upper part of generator 10. In operation, the liquid columns may form in conduits 43, 48, and down-leg of tube 24 to the levels $x$, $y$ and $z$, for example. The conduits are of such size that restriction to gas flow is effected without appreciably restricting flow of liquid.

After the system is charged with a suitable water solution of refrigerant in absorption liquid, the system is evacuated in any suitable manner, as, for example, by a vacuum pump connected to the outer end of a conduit 50' which is in communication with the bottom part of condenser 11, as will be described presently. A suitable valve 51' is provided in conduit 50' to keep the system at the evacuated low pressure.

During operation of the refrigeration system, noncondensible gases may collect in condenser 11, evaporator 12 and absorber 14. The noncondensible gases in the lower pressure side of the system are carried to the bottom part of absorber 14 by the sweeping action of the entering refrigerant vapor. By sweeping action it is meant that a downward movement is imparted to the noncondensible gases by the high velocity of the refrigerant vapor flowing into the absorber.

The non-condensible gases that may accumulate in the system may include hydrogen and oxygen. When non-condensible gases accumulate in the absorber 14 the pressure therein increases, and, since the evaporator 12 is in open communication with the absorber, the evaporator pressure also rises. This increase in pressure is objectionable because of the resulting rise of the evaporator temperature and the fact that the effectiveness of the absorber is impaired by the non-condensible gases occupying a part of the absorber space.

The non-condensible gases are transferred from absorber 14 to condenser 11 by diverting from conduit 31 into conduit 50 a small portion of the absorption liquid flowing toward the absorber. The diverted liquid flows through conduit 50 into the bottom part of a vessel 51 which preferably is provided with a suitable orifice to restrict the flow of the diverted liquid. The liquid level in vessel 51 intermittently rises and falls due to the siphoning action that takes place in the upper part of a conduit 52 connected to the top part of the vessel 51. During the times when the liquid level falls in vessel 51 below the top part of conduit 52, any non-condensible gas flowing into the vessel through conduit 53 from the bottom part of absorber 15, can pass into the upper bent or curved portion of conduit 52. With subsequent rise of liquid level a small volume of non-condensible gas is trapped and siphoned downwardly in conduit 52. The small volumes of non-condensible gases withdrawn from the bottom part of absorber 14 in this manner are trapped between successive bodies or slugs of liquid formed at the upper bent part of vertical conduit 52. The conduit 52 is of such size that gas and liquid cannot freely pass each other during flow therethrough, and, as the slugs of liquid and trapped gas pass downwardly in the conduit, the gas is compressed. From the lower end of conduit 52 the gas passes upwardly through liquid in a chamber 54 and then flows through a conduit 55 into conduit 23. The non-condensible gases entering conduit 23 are swept into the upper part of condenser 11 by the expelled vapor flowing upwardly from generator 10 at a relatively high velocity.

The absorption liquid entering chamber 54 through conduit 52 overflows through conduit 56 to join absorption liquid flowing from absorber 14 through conduit 43. The arrangement just described for transferring non-condensible gases from absorber 14 to condenser 11 is described in Anderson application Serial No. 390,872, filed April 29, 1941, and, if desired, reference may be made thereto for a more detailed description of the manner in which transfer of gases to condenser 11 is effected.

Transferring the non-condensible gases from absorber 14 to condenser 11, when such gases accumulate, is desirable, because the presence of non-condensible gases in the condenser is not subject to the same objections that apply when the gases remain in the absorber. Since the condenser pressure is greater than the absorber pressure, the non-condensible gases will be compressed and occupy less space in the condenser than in the absorber. However, the presence of non-condensible gases in condenser 11 is undesirable because such gases reduce the effective condensing surface.

In accordance with this invention a shell or cartridge 57 is connected by a conduit 58 to the bottom part of condenser 11. The conduit 58 is connected to the top part of shell 57, and to the bottom part of the shell is connected a vertically extending conduit 59 having the upper end thereof connected to conduit 58. To the bottom part of shell 57 is also connected a tube 60 provided with a fitting which is fixed to a bracket 61. The bracket 61 may be connected to a suitable support 61', such as a frame member, for example, associated with the refrigeration system. The upper part of tube 60 is connected to valve 51' and conduit 50' to which a suitable vacuum pump is adapted to be connected for evacuating the refrigeration system, as described above.

Within the shell 57 is disposed a sleeve or tubular member 62 adapted to receive a heating element 63 which is connected by conductors 64 and 65 to a suitable source of electrical energy. In the space within shell 57 and about the sleeve 62 is arranged a stack of cupric oxide plates 66. The plates 66 are annular or ring-shaped with the inner peripheral edges fitting snugly against the sleeve 62 between rings 67 which hold the plates in spaced relation. The outer peripheral portions of the plates 66 are bent to form aligned flanges, as indicated at 68 in Fig. 2, the outer flanges serving as stiffeners for the plates and also acting to keep the plates in the desired spaced relation over their entire areas.

In practice I have found that plates 66 formed of copper hardware cloth of about 30 mesh are highly satisfactory. The plates 66 are of such size that the flanges 68 are spaced from the wall of the shell 57 when the plates are positioned in the shell. All parts of the shell 57 including the top and bottom, and also the sleeve 62, are preferably formed of copper. The plates 66 are first positioned on the sleeve 62 between the spacer rings 67, the plates being held in place at one end by the part serving as the top of the shell 57. The bottom end of sleeve 62 is then distorted slightly to hold the plates 66 together. The assembly of parts just described forms an insert which is then subjected to oxidation. The plates are preferably oxidized about 80 to 85 per cent in order to leave some pure copper wiring in the plates for the purpose of stiffening and supporting the plates. After oxidizing the plates 66, a cap 69 is secured to the lower end of sleeve 62, as by silver soldering, for example, and the insert in its entirety is positioned within shell 57. To hold the insert rigidly in place the part thereof serving as the top is secured at 70 to the upper edge of shell 57, as by silver soldering, for example.

During operation of the refrigeration system, the non-condensible gases transferred from absorber 14 to condenser 11, and also the non-condensible gases collecting in condenser 11, are carried to the dead or far end of the condenser by the sweeping effect of the expelled refrigerant vapor flowing into the condenser. By connecting the shell 57 to the dead or far end of condenser 11, free access of the non-condensible gases to the cupric oxide in shell 57 is provided. The gases swept to the bottom part of condenser 11 pass by diffusion through conduit 58 into shell 57. By heating the sleeve 62 and plates 66 secured thereto, upward flow of gas is induced through the stack of cupric oxide plates 66. The provision of conduit 59 permits gas to flow downwardly in this conduit and thence upwardly through the interior of shell 57, so that a circuit is provided in which gas is continuously circulated by thermal convection.

The cupric oxide reacts with hydrogen gas, the speed of the chemical reaction being hastened by heating the shell 57 by the heating element 63 to a suitable elevated temperature, such as 500° F., for example. Metallic copper and water are formed as a result of the chemical reaction taking place in shell 57, such water being formed in vapor phase and passing by diffusion through conduit 58 into condenser 11 in which it is cooled and liquefied.

In the event that oxygen is swept into the dead or far end of condenser 11 and then passes into shell 57, the metallic copper will react with the oxygen to form cupric oxide. In this manner both hydrogen and oxygen can be removed in the event these gases collect in the refrigeration system.

The shell 57 with the stack of cupric oxide plates therein provides an arrangement whereby a relatively large contact area is presented to gas flowing through the shell. The cupric oxide being in perforated sheet form provides a large surface area without appreciably blocking the flow of gas. The gas is permitted to come in contact with the material and at the same time a path of flow for gas is provided at the shell wall which is substantially free and clear of any obstruction. The well or recess formed by the sleeve 62 permits the heating effect to be transmitted more or less uniformly from the heating element 63 to the plates 66 which are held in good thermal conductive relation with the sleeve 62 by the spacer rings 67.

The cupric oxide plates 66 are held in spaced relation on the sleeve 62 which in turn is carried by the top of the shell 57. With this arrangement the cupric oxide plates are replaceable by merely disuniting the top of the shell from the cylindrical portion thereof and inserting another assembled stack of cupric oxide plates. In the event the shell is subject to shock or vibration, any shock or vibration is not readily transmitted to the more or less fragile cupric oxide plates 66 because these plates are spaced from all of the shell walls except at the top at which region the sleeve 62 and the plates are supported.

While a single embodiment of the invention has been shown and described, it will be apparent that modifications and changes may be made without departing from the scope and spirit of the invention, as pointed out in the following claims.

What is claimed is:

1. In a refrigeration system of an absorption type having a plurality of interconnected parts, one of said parts providing a chamber, and a stack of cupric oxide plates disposed in said chamber.

2. In a refrigeration system of an absorption type having a plurality of interconnected parts, one of said parts providing a chamber, an element in said chamber, and a plurality of cupric oxide plates mounted in spaced relation on said element.

3. In a refrigeration system of an absorption type having a plurality of interconnected parts, one of said parts providing a chamber, and an insert adapted to be positioned in said chamber and detachable therefrom, said insert comprising an element and a plurality of annular-shaped cupric oxide plates mounted on and disposed about said element.

4. In a refrigeration system of an absorption type having a plurality of interconnected parts, structure providing a chamber, a first conduit connecting the upper part of said chamber and the gas space of one of said parts, a second conduit connecting said first conduit and the bottom part of said chamber, a substance in said chamber capable of reacting chemically with a non-condensible gas which may accumulate in the system, and means to effect heating of said chamber to cause circulation of gas through said chamber and said first and second conduits by thermal convection.

5. In a refrigeration system of an absorption type having a plurality of interconnected parts, one of said parts providing a chamber, a hollow element disposed in said chamber, a plurality of discs mounted on said hollow element and occupying space in said chamber, and means for heating said hollow element, said discs being formed of a material capable of reacting chemically with a non-condensible gas that may accumulate in the system to effect removal of such gas.

6. In a refrigeration system of an absorption type having a plurality of interconnected parts, one of said parts providing a chamber, and an insert adapted to be positioned in said chamber and detachable therefrom, said insert comprising an element and a plurality of plates mounted thereon, said plates being formed of a material capable of reacting chemically with a non-condensible gas that may accumulate in the system to effect removal of such gas.

7. In a refrigeration system of an absorption type having a plurality of interconnected parts, one of said parts providing a chamber, and structure including a plurality of cupric oxide plates disposed in said chamber, said plates being formed from sheeting, such as copper hardware cloth, for example.

8. In a refrigeration system of an absorption type having a plurality of interconnected parts, one of said parts providing a chamber, and structure including a plurality of cupric oxide screens disposed in said chamber, said screens being oxidized at least 20 per cent and less than 100 per cent so that the pure copper remaining in said screens serves as stiffeners for said screens.

9. For use with a refrigeration system, structure providing a chamber and adapted for connection to the gas space of the system in such a manner that hydrogen that may accumulate in the system can flow into the chamber, and a stack of cupric oxide sheets in said chamber, said sheets being formed of oxidized copper screening and being capable of reacting chemically with the hydrogen to effect removal of the hydrogen.

WALTER CROPPER.